(12) United States Patent
Ponzio et al.

(10) Patent No.: US 12,142,975 B2
(45) Date of Patent: Nov. 12, 2024

(54) DEVICE AND METHOD FOR WIDENING ENDS OF LEGS OF HAIRPIN CONDUCTORS

(71) Applicant: ATOP S.p.A., Florence (IT)

(72) Inventors: Massimo Ponzio, Siena (IT); Rubino Corbinelli, Siena (IT)

(73) Assignee: ATOP S.p.A., Barberino Tavarnelle (IT)

( * ) Notice: Subject to any disclaimer, the term of this patent is extended or adjusted under 35 U.S.C. 154(b) by 721 days.

(21) Appl. No.: 17/298,907

(22) PCT Filed: Dec. 19, 2019

(86) PCT No.: PCT/EP2019/086288
§ 371 (c)(1),
(2) Date: Jun. 1, 2021

(87) PCT Pub. No.: WO2020/127718
PCT Pub. Date: Jun. 25, 2020

(65) Prior Publication Data
US 2022/0060091 A1    Feb. 24, 2022

(30) Foreign Application Priority Data

Dec. 21, 2018 (EP) .................................. 18215154

(51) Int. Cl.
*H02K 15/00* (2006.01)
*H02K 1/16* (2006.01)
*H02K 3/14* (2006.01)

(52) U.S. Cl.
CPC .......... *H02K 15/0087* (2013.01); *H02K 1/16* (2013.01); *H02K 3/14* (2013.01); *Y10T 29/53161* (2015.01)

(58) Field of Classification Search
CPC .. H02K 15/0087; H02K 3/14; H02K 15/0031; H02K 15/064; H02K 15/0421;
(Continued)

(56) References Cited

U.S. PATENT DOCUMENTS 7,721,413 B2 *   5/2010   Guercioni ............ H02K 15/064
                                                                  29/874
10,523,097 B2 *  12/2019  Yamada ............. H02K 15/0421
(Continued)

FOREIGN PATENT DOCUMENTS

JP   2005-224028   8/2005
JP   2015-035922   2/2015
(Continued)

*Primary Examiner* — Thiem D Phan
(74) *Attorney, Agent, or Firm* — Haley Guiliano LLP; Jeffrey H. Ingerman (57) ABSTRACT

A device for widening ends of legs of hairpin conductors, arranged in slots of a stator core, includes at least one finger, for radially moving the ends of legs of hairpin conductors. The at least one finger includes at least one radially extending arm and a separation member arranged adjacent to an end of the arm. The separation member is designed to be positioned between two ends of radially neighboring legs of pairs of hairpin conductors. The finger has a first section adjacent to the separation member. The first section is adapted for moving the pair of ends of legs when the finger is radially moved. The finger has a second section, which does not overlap with the first section. The second section is dimensioned to receive at least one pair of legs without moving, when the finger is radially moved.

18 Claims, 7 Drawing Sheets

(58) Field of Classification Search
CPC ......... Y10T 29/49009; Y10T 29/49218; Y10T 29/53161
USPC .......................... 29/736, 721, 729, 732, 596
See application file for complete search history.

(56) References Cited

U.S. PATENT DOCUMENTS

2018/0183307 A1    6/2018   Mitsuhiro et al.
2018/0212496 A1    7/2018   Axel et al.

FOREIGN PATENT DOCUMENTS

JP           2015-171260     9/2015
WO    WO 2012/093413    7/2018

* cited by examiner

DEVICE AND METHOD FOR WIDENING ENDS OF LEGS OF HAIRPIN CONDUCTORS

CROSS-REFERENCE TO RELATED APPLICATIONS

This application is a national stage application under 35 U.S.C. § 371 of International Application PCT/EP2019/086288, filed Dec. 19, 2019, which claims the benefit of and priority to European Patent Application No. 18215154.8, filed Dec. 21, 2018, each of which is hereby incorporated by reference herein in its respective entirety.

The present invention relates to a device and a method for widening ends of legs of hairpin conductors arranged in slots of a stator core, and to a device and a method for twisting ends of legs of hairpin conductors arranged in slots of a stator core.

Generally the present invention relates to apparatuses and processes for aligning wire conductors members inserted in slots of a core of a dynamo electric machine.

It is known in the art to use apparatuses and processes adapted for the manufacturing of stator coils for dynamo electric machine.

In a typical manufacturing scenario coil members are inserted in slots of a core of an electric dynamo machine. Pairs of wire conductors extending from the coil members are welded together, wherein each conductor belongs to a coil member. Coil members of this type can be those having a fork like shape, normally referred to as "U shaped coil members" or "hairpins" in the art. A hairpin conductor may be typically provided with two legs and a connection portion between said legs. Alternatively the conductor may only have one leg or more than two legs.

One part of the hairpin conductor, for example the connection portion, extend axially outward of the stator on one axial side of the stator core whereas the legs extend out of the slots on the opposite axial side of the stator core. By mutually connecting two of the extending legs, a continuous conductor similar to a winding can be created.

Stators wound with hairpin coil members are typically used for electric drives or hybrid drives of automotive vehicles.

The hairpin conductors may be preshaped and/or may be preassembled into a partial or a full nest outside the stator core.

After insertion of the nest into the core, the ends of the hairpin conductors have to be arranged, such that pairs to be connected are close to each other. In a further step the legs may be pressed together and may be connected by welding.

The arrangement of hairpin conductors usually is achieved by a twisting device. A twisting device usually comprises at least a first and a second ring coaxial with each other and extended around a twisting axis. The rings comprise respectively a first and a second circular array of pockets. The rings are relatively rotatable with respect to each other around the twisting axis in order to assume at least a first and a second configuration in which respective pockets of the first and second array are radially aligned with each other in pairs with respect to the twisting axis.

When the twisting device is in the first configuration ends of legs of hairpin conductors protruding from the stator may be inserted in the pockets. After rotating the rings to the second configuration the two legs having been radially aligned in the first configuration are radially offset from each other by a predefined pitch in the second configuration.

A fundamental requirement of the connection operation is the accurate and repeatable positioning of the ends of conductors with respect to each other and to the twisting device. For the subsequent welding process the ends have to be positioned closely together.

An increased hourly production of these stators requires a reduction in the time available for performing the arranging and welding operation. This leaves less time for carrying out the positioning of the ends of the pairs of conductors.

It is an object of the present invention to avoid the drawbacks of the state of the art and in particular to provide devices and methods for quick and precisely arranging ends of hairpin conductors in preparation of a welding step.

According to the present invention, these and other objects are solved with the devices and methods according to the independent patent claims.

According to a first aspect of the invention a device according to the invention is suitable for widening ends of legs of hairpin conductors arranged in slots of a stator core.

Typically hairpin conductors are inserted in slots of a stator core and the ends of the legs of hairpin conductors axially protrude from the stator core. The slots are arranged circumferentially such that pairs of legs of conductors are aligned radially.

To allow inserting the end of the legs into pockets of a twisting device the ends have to be distanced from each other. This step is called widening. Preferably pairs of end of legs, belonging to a specific layer of the stator have to be distanced with respect to a pair of ends of legs of a neighboring layer. A layer comprises and first group of ends of legs having a first distance to the stator axis and a second group of ends having a second distance to the stator axis, wherein two of the extending legs, one belonging to the first group and one belonging to the second group, are to be mutually connected.

The device according to the invention comprises at least one finger for radially moving the ends of legs of hairpin conductors. Preferably the device comprises a plurality of fingers, such that a plurality of ends of legs may be moved independently and/or simultaneously.

Said at least one finger is arranged moveably in a radial inward and in a radial outward direction. Said at least one finger is arranged moveably in an axial upward and in an axial downward direction.

Said at least one finger comprises at least one radially extending arm and a separation member.

Preferably said arm is designed to be positioned between two circumferentially adjacent legs of hairpin conductors.

The separation member is arranged adjacent to a, preferably radially inner, end of the arm.

The separation member may be connected to the arm. The arm and the separation member may be integrally formed.

The separation member may be arranged such that the arm and the separation member include an angle of 90°. The separation member preferably has a circumferential extension. The circumferential dimension of the separation member preferably corresponds to the circumferential dimension of a leg of a hairpin conductor, which is arranged in the stator.

The separation member preferably has an axial extension, which corresponds to the lengths of the ends of the legs, that are to be made available for connecting.

Said separation member is designed for being positioned between two ends of radially neighboring legs of pairs of hairpin conductors.

The separation member may comprise a tapered axial end, which allows introducing the separation member between the ends of the legs from an axial direction.

Said finger has a first, preferably radially inner, section adjacent to the separation member.

Preferably the first section is part of a space which is encompassed by the separation member and the arm.

Said first section has a first radial width dimensioned to receive at least one pair of legs and is adapted for moving said pair of legs when the finger is radially moved.

Preferably the first section is dimensioned to receive a pair of end of legs and is adapted for moving the ends.

Preferably the first radial width is dimensioned for receiving exactly one pair of legs.

The radial extension of a leg of a conductor is in a range of 2 mm to 5 mm. The circumferential extension of a leg of a conductor is also in a range of 2 mm to 5 mm.

Accordingly the first section has radial width in a range of 4.5 mm to 10.5 mm.

The finger has a second, preferably radially outer, section, which does not overlap with the first section.

Preferably the second section also is part of a space which is encompassed by the separation member and the arm.

Preferably a separation web is arranged between the first and the second section. The second section may be part of a space which is encompassed by said web and the arm.

Said second section has a second radial width, wherein said first radial width is smaller than the second radial width.

Preferably the second section has radial width in a range of 11 mm to 23 mm.

The arm has a radial length which is greater than the sum of the radial with of the first section and the radial width of the second section.

Hence the second section is dimensioned to at least receive one pair of ends.

Furthermore said second section is dimensioned to receive at least one pair of legs and the finger may be radially moved without moving the pair of legs hosted in the second section.

A first pair of ends of legs, positioned radially outward from a second and a third pair of legs, may be received by the first section when the finger has been brought to the respective radial position and been moved axially such that the separation element is positioned between a first and second pair of ends of legs. Then, the finger may be moved radially outward, such that the first and the second pair of ends of legs become more distanced.

The finger may then perform an axial movement to release the first pair of legs from the first section. Now the separation member may be positioned between the second and the third pair of ends of legs, such that the second pair of ends is received in the first section and the first pair of ends is received in the second section. The second section has a sufficient radial widths, such that the first pair remains at its radial position when the finger is radially moved to distance the second and the third pair. The arm may serve as a guiding face, such that the circumferential position of the ends of legs is also maintained.

Preferably the radial width of the second section is large enough to host at least two pairs of end of legs being distanced from each other.

The at least one finger is adapted to radially move the ends of a pair of legs over a radial moving distance.

Preferably at least a radially outermost pair of legs is moved in a radial outward direction.

Preferably a radial length of the arm is larger than the sum of said radial moving distance and at least twice of the radial extension of the ends of legs.

The radial extension of a pair of ends of legs corresponds to twice of the radial extension of the ends of legs, because the ends of a pair of legs are arranged close to each other.

In a preferable embodiment of the device, said at least one finger has a seat for axially receiving the ends of legs of hairpin conductors.

Said seat comprises a first, preferably radially inner, compartment providing the first section and having a first radial compartment width dimensioned to receive at least one pair of ends of legs.

The first radial compartment width corresponds the radial width of the first section.

Said seat further comprises a second, preferably radially outer, compartment providing the second section and having a second radial compartment width. The second radial compartment width corresponds to the radial width of the second section.

Hence, said first radial compartment width is smaller than the second radial compartment width.

Preferably the seat and the compartments are firmly attached to the finger and may be integrally formed.

The separation member may be formed by one of the walls, preferably a wall being arranged at a radially inner end, radially bounding the first compartment.

A wall between the first and the second compartment may form a separation web between the first and the second section.

The finger may comprise two radially extending arms, forming the sidewalls of the compartments.

The compartments at least are open in one axial direction which points to the ends of the legs. The lateral sidewalls of the compartments may provide lateral guiding faces which prevent a circumferential movement of the ends of legs, as well during movement of the legs as during movement of neighboring end of legs.

The compartments may comprise a bottom plate or may be open in the axial direction which points away from the ends of the legs.

When the finger is axially moved in the direction of the legs, at least one pair of legs may be received by the first compartment, while at least one other pair of legs may be received by the second compartment.

When the finger is radially moved, the pair of ends of legs received in the first compartment is moved together with the compartment, while the at least other pair of legs hosted by the second compartments is not moved.

The first compartment may be dimensioned to receive exactly one pair of ends.

The pair of ends of legs may belong to a layer of a stator winding, in which connections are to be established in a further step.

The second compartment is dimensioned to receive at least two pairs of ends. Hence, the device may be used to separate at least three pairs of legs. When a last pair of legs remains unmoved by the device, up to four pairs of legs, being radially aligned in a row, may be separated from each other.

Each plurality of circumferentially arranged pairs having the same distance from the stator axis forms a layer. Hence, conductors may be prepared for welding for a stator winding with up to four layers.

The finger may be rotatable around the stator axis in a circumferential direction and separate one radially aligned row of ends of legs after another.

In preferred embodiment the machine comprises a plurality of circularly arranged fingers and the fingers are independently moveably. The fingers may be moved simultaneously, such that a plurality of radially aligned ends of legs may be widened at the same step. Preferably there is a finger for all radially aligned rows of ends of legs.

A method according to the invention is suitable for widening ends of legs of hairpin conductors arranged in slots of a stator core.

The method preferably uses a device as described above and comprises the following step.

A separation member being connected to a, preferably radially inner, end of a radially extending arm is positioning between two ends of radially neighboring pairs of legs of hairpin conductors. The separation member preferably is positioned by axially moving the arm and the separation member.

At least one first pair of legs of hairpin conductors is radially moved by radially moving said separation member.

Said at least one first pair of legs is disengaged from said separation member. Preferably the pair of legs is disengaged by axially moving the arm and the separation member.

The separation member is radially moved to a radial position corresponding to the radial position of at least one second pair of legs, whilst at least one first pair of legs is kept stationary.

The separation member is positioned adjacent to the second pairs of legs, preferably on the radially inner side, preferably by an axial movement.

Preferably said second pair of legs is radially moved by radially moving said separation member, whilst the at least one first pair of legs is kept stationary.

In a favourable embodiment, further pairs of ends may be radially moved one after another, while pairs already have been moved are kept stationary.

In a preferential embodiment a plurality of pairs arranged circumferentially around a stator axis are radially moved in the same operation step by a plurality of separation members.

In preferred embodiment of the method, at least one first pair of legs is inserted in a first, preferably radially inner, compartment of a seat of a finger, said first radial compartment having a first radial compartment width.

A circumferentially extending wall of the first compartment serves as a separation member. The wall is preferably a radially inner wall.

The at least one first pair of ends of legs is radially moved by moving said finger radially.

Preferably the first pair of ends of legs is moved in a radial outward direction to be distanced from a second pair of ends.

The at least one first pair of ends of legs is disengaged from said first compartment, preferable by axial movement of the finger.

The finger is then radially moved to a radial position corresponding to the radial position of at least one second pair of ends of legs, radially adjacent to the first pair of ends.

Said at least one second pair of ends of legs is inserted into the first compartment and the at least one first pair of legs is inserted in a, preferably radial outer, second compartment having a second radial width larger than the first radial compartment width. The first pair of ends maintains its position.

Said second pair of ends of legs is radially moved by moving said finger radially, whilst the at least one first pair of ends of legs is kept stationary.

Preferably the second pair of ends of legs is moved in a radial outward direction while the first pair of ends is not moved. The first pair and second pair come closer to each other, but they have a greater distance than before radially moving the first pair of ends.

Each step of radial movement provides an exact positioning of a pair of ends of legs, which is maintained during further movement steps for positioning further pairs.

After the widening process pairs of ends of legs are separated and thus they are prepared to be inserted in pockets of a twisting device.

A second aspect of the invention concerns a device for twisting ends of legs of hairpin conductors arranged in slots of a stator core.

Preferably pairs of ends of legs of hairpin conductors have been separated by a device and/or method for widening ends as described above.

The device for twisting comprises at least one pair of adjacent rings having a radially outer ring and a radially inner ring.

The inner and outer ring are direct neighbors, no intermediate ring is arranged between the inner and outer ring.

At least one of said inner and said outer ring is moveable in a circumferential direction relative to the other ring. Preferably said inner ring and said outer ring are moveable in circumferential opposite directions.

The device may comprise further pairs of rings. Each pair of ring is for positioning a layer of conductors of a stator winding.

Each of said inner ring and outer ring comprises open pockets for receiving the end of a leg of a hairpin conductor. Each open pocket is dimensioned for receiving exactly one end of leg.

The open pockets in said radially outer ring have a radial outer wall and a radially inner open end.

The open pockets in said radially inner ring have a radial inner wall and a radially outer, open end.

The open pockets may have lateral walls and may also have a bottom plate. Between lateral walls of circumferentially adjacent open pockets there is a radial guiding face.

Each open pocket of the inner ring forms a joint closed pocket for receiving a pair of end of legs with a respective open pocket of the outer ring when the inner and the outer ring are circumferentially aligned. The radial guiding faces of the inner and the outer ring are also radially aligned and may contact each other in this position.

The joint closed pockets each have the radial outer wall of an open pocket of the outer ring and the radial inner wall of an open pocket of the inner ring. The joint closed pockets may have lateral walls formed by lateral walls of the open pockets.

The joint closed pocket is dimensioned for receiving exactly one pair of ends of legs, which are arranged close to each other.

Since the joint closed pocket for receiving a pair of end of legs is formed by two open pockets, there is no separation wall between the pocket for hosting one end of the pair of ends and the pocket for hosting the other end of the pair of ends.

By moving at least one of the rings in a circumferential direction, the ends of the legs are bent such that each hairpin conductor has an additional pitch.

During twisting the radial position of the ends of legs housed in the open pockets may be maintained by the walls of the open pockets and by the guiding faces of the opposite ring.

Ends of legs of conductors of a respective layer can be brought together close to each other not just immediately before welding, but already before twisting. Since the ends of legs have to be widened before insertion into the twisting device anyway, an additional step of bringing together the ends of a layer after twisting is not necessary.

At least one of the rings may be circumferentially moveable, such that open pockets of the inner ring and the open pockets of the outer ring form first joint closed pockets in a starting position and form second joint closed pockets in an end position.

Thus, in starting position pairs of ends of legs may be inserted into the joint closed pockets. After twisting, that is circumferentially moving at least one of the rings, new pairs of ends of legs are combined in second joint closed pockets.

The degree of rotating the rings defines the pitch of the conductors. For example, the number of open pockets between the end of a first leg and the end of the other leg of the same hairpin conductor plus one corresponds to the pitch of the conductor.

A method according to the invention is suitable for twisting the ends of legs of hairpin conductors in a stator core and uses a device for twisting as described above.

The method comprises the following steps.

At least a pair of ends of legs of hairpin conductors is inserted in a joint closed pocket formed by an open pocket of the inner ring and an open pocket of the outer ring.

At least one of the inner ring and the outer ring is circumferentially turned, while one end of the pair of ends of the legs remains in the open pocket of the inner ring and one of the ends of the pair remains in the open pocket of the outer ring. The ends of the originally inserted pair are distanced from each other and tee ends are bent by this process step.

Preferably a plurality of pairs of ends of legs circumferentially arranged with respect to the axis of a stator is inserted in corresponding plurality of join closed pockets, formed by an open pocket of in inner ring and an open pocket of an outer ring. There may be more than one pair of inner and outer rings.

In a preferable embodiment of the method, each pair of a plurality of pairs of ends of legs of hairpin conductors is inserted into a joint closed pocket, and after circumferentially turning new pairs of ends of legs are arranged in joint closed pockets. Preferably all ends of legs are part of a new pair.

Additional ends of special conductors may also be inserted in a joint pocket. Not all ends need to be part of a pair. Also after twisting, there may be joint closed pockets, which host only one end of a leg of a conductor.

Thus, the ends of legs are prepared to be welded and to form a winding.

Figure 1:
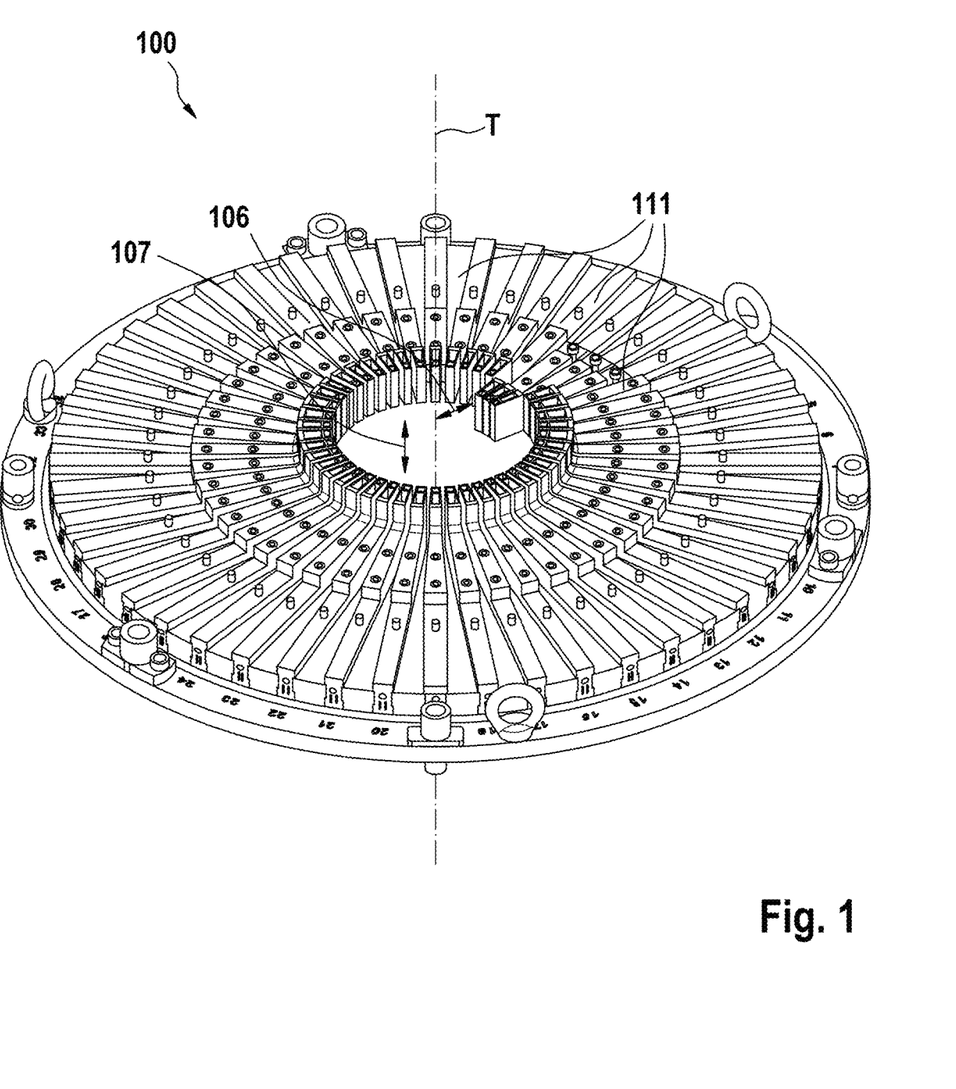
FIG. 1 a perspective view of a device for widening ends of legs of hairpin conductors.

The invention will be explained hereinafter with reference to the description of specific embodiments and the respective drawings, which show:

FIG. 1 shows a perspective view of a device 100 for widening ends of legs of hairpin conductors.

Figure 3:
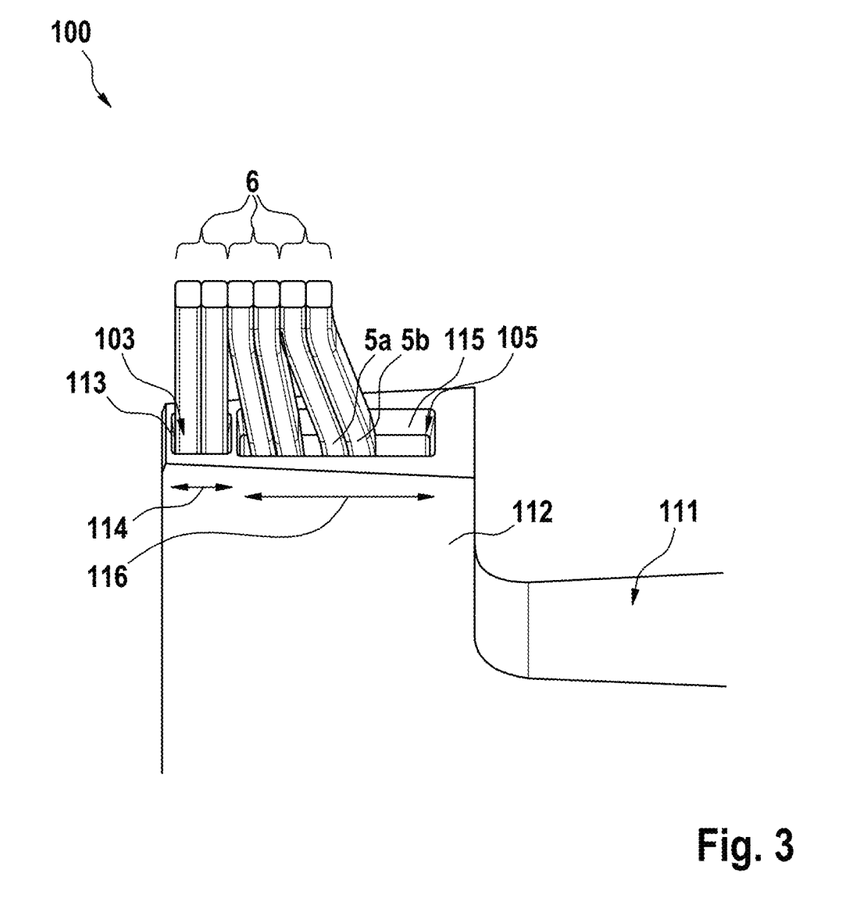
FIG. 3 a further perspective view of detail of a finger of a device for widening ends of legs of hairpin conductors.

The device comprises a plurality of fingers 111, for radially moving the ends 5a, 5b of legs of hairpin conductors (see FIG. 3).

The fingers 111 are circumferentially arranged with respect to a system axis T corresponding to the axis of a stator (not shown in the figures).

The fingers 111 are arranged moveably in a radial direction 106 and they are arranged moveable in an axial direction 107.

The fingers 111 are independently moveably.

Figure 2:
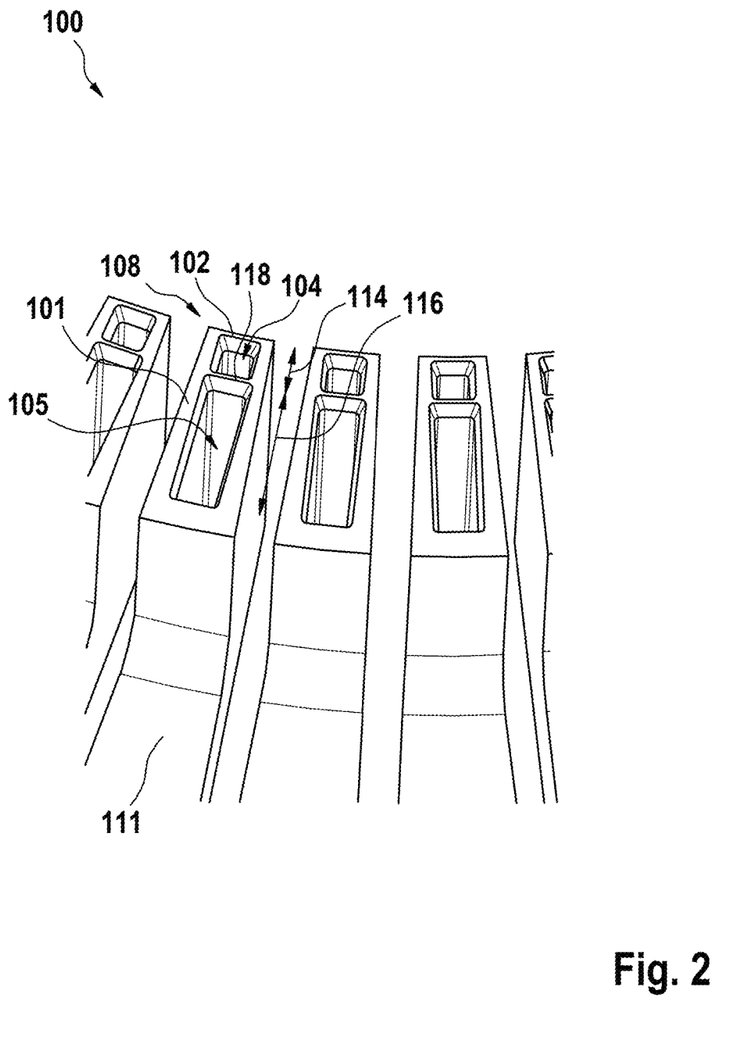
FIG. 2 a perspective view of detail of a device for widening ends of legs of hairpin conductors.

FIG. 2 shows a perspective view of detail of a device 100 for widening ends 5a, 5b of legs of hairpin conductors (see FIG. 3).

Each finger 111 comprises at least one radially extending arm 101 and a separation member 102 being arranged adjacent to a radially inner end 108 of the arm 101.

The separation member 102 is designed for being positioned between two ends 5a, 5b (see FIG. 3) of radially neighboring legs of pairs of hairpin conductors.

Each finger 111 has a first, radially inner, section 104 adjacent to the separation member 102. The first section 104 has a first radial width 114 dimensioned to receive at least one pair of legs 5a, 5b (see FIG. 3) and is adapted for moving said pair of legs 5a, 5b (see FIG. 3) when the finger 111 is radially moved.

Each finger 111 has a second, radially outer, section 105, which does not overlap with the first section 104. Said second section 105 has a second radial width 116.

The first radial width 114 is smaller than the second radial width 116. The second section 105 is dimensioned to receive at least one pair of legs 5a, 5b (see FIG. 3) without moving, when the finger 111 is radially moved.

A separation web 118 is arranged between the first section 104 and the second section 105.

FIG. 3 shows a perspective view of detail of a finger 111 of a device 100 for widening ends 5a, 5b of legs of hairpin conductors.

Each finger 111 has a seat 112 for axially receiving the ends 5a, 5b of legs of hairpin conductors. The seat 112 comprises a first, radially inner, compartment 113 providing the first section 103 and having a first radial compartment width 114 dimensioned to receive one pair 6 of legs, and a second, radially outer, compartment 115 providing the second section 105 and having a second radial compartment width 116. The first radial compartment width 114 is smaller than the second radial compartment width 116.

The second compartment 115 is dimensioned to receive at least two pairs 6 of ends 5a, 5b.

Figures 4A, 4B, 4C:
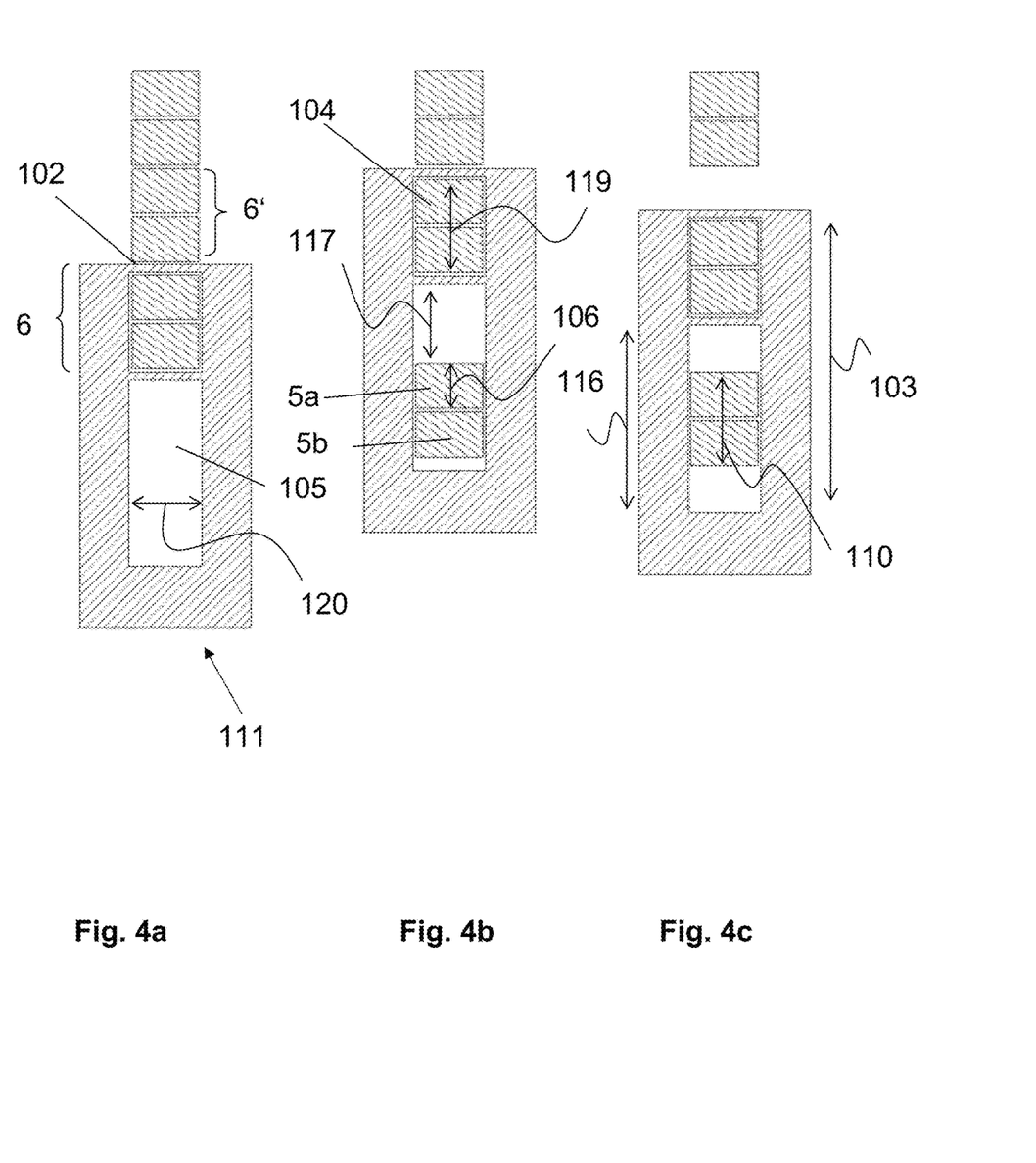
FIGS. 4a-4c a schematic illustration of method steps for widening ends of legs of hairpin conductors.

FIGS. 4a-4c show a schematic illustration of method steps for widening ends of legs of hairpin conductors.

The fingers 111 are adapted to radially move the, preferably at least radially outermost, ends 5a, 5b of the pair 6 of ends of legs over a radial moving distance 117.

The second radial width 116 is larger than the sum of said radial moving distance 117 and at least twice of the radial extension 110 of the pairs of ends of legs.

The second radial width 116 preferably is in a range of 11 mm to 23 mm.

The radial width 119 of the first section 104 preferably is in a range of 4.5 mm to 10.5 mm.

The circumferential width 120 of the first section 104 and the second section 105 preferably is in a range of 2.5 mm to 5.5 mm.

A radial length 103 of the arm 101 is larger than the sum of said radial moving distance 117 and at least twice of the radial extension 110 of the pairs of ends of legs.

In a first step a separation member 102 is positioned between two ends of radially neighboring pairs 6, 6' of legs of hairpin conductors (see FIG. 4a).

The first pair 6 of legs of hairpin conductors is radially moved by radially moving the separation member 102. The first pair 6 of ends of legs is disengaged from said separation member 102. The separation member 102 is then radially moved to a radial position corresponding to the radial position of at least one second pair 6' of legs, whilst keeping the at least one first pair 6 of legs stationary (see FIG. 4b).

The second pair 6' of legs is radially moved by radially moving said separation member 102, whilst keeping the first pair 6 of legs stationary.

Figure 5:
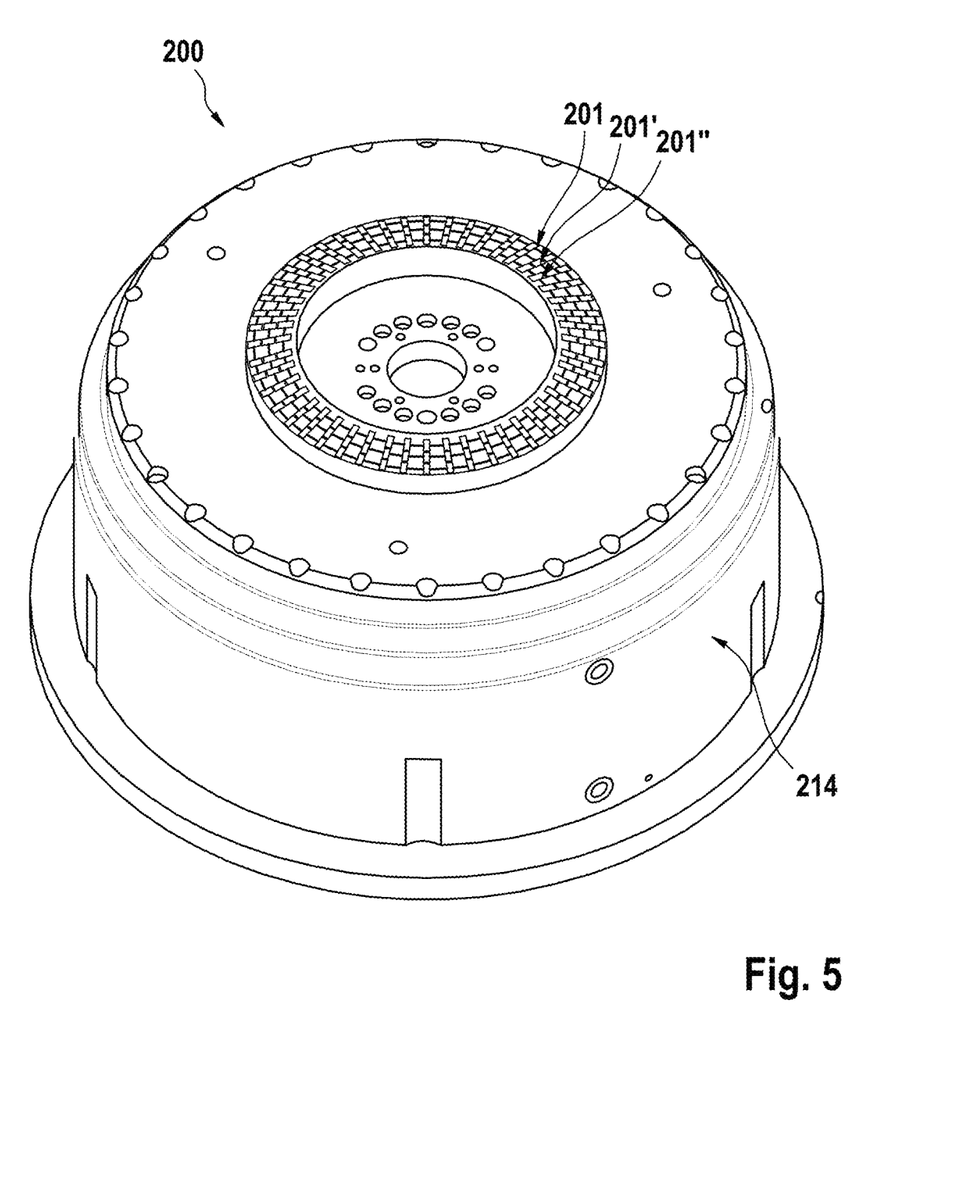
FIG. 5 a perspective view of a device for twisting ends of legs of hairpin conductors.
Figure 7:
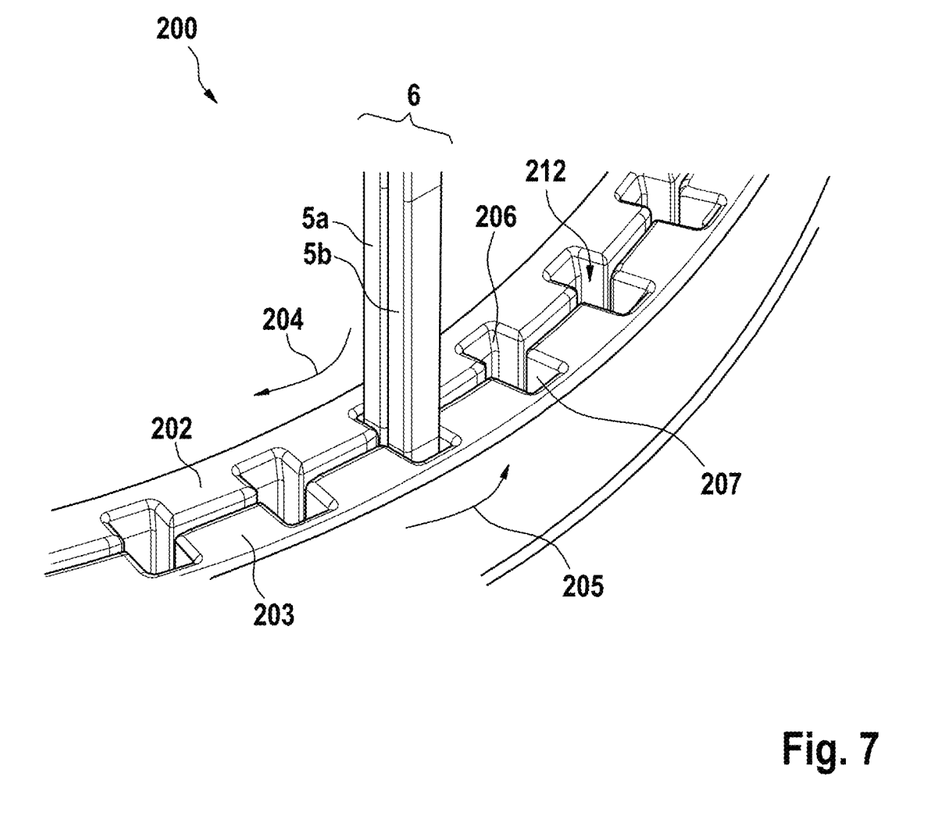
FIG. 7 a perspective view of a further detail of a device for twisting ends of legs of hairpin conductors.

FIG. 5 shows a perspective view of a device 200 for twisting ends 5a, 5b of legs of hairpin conductors (see FIG. 7).

Figure 6:
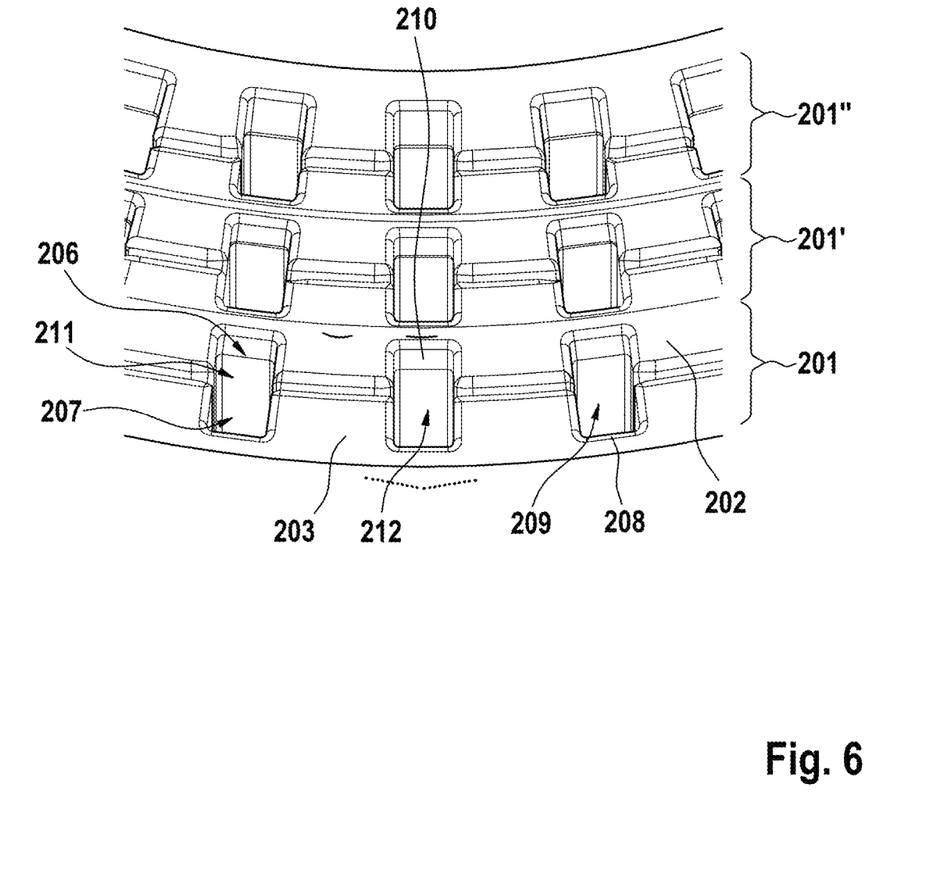
FIG. 6 a perspective view of a detail of a device for twisting ends of legs of hairpin conductors.

The device 200 comprises a plurality of pairs 201, 201', 201" of adjacent rings 202, 203 (see FIG. 6). The device 200 comprises an actuation apparatus 214 for independently moving the rings 202, 203 in circumferential directions 204, 205.

FIG. 6 shows a perspective view of a detail of a device for twisting ends 5a, 5b of legs of hairpin conductors (see FIG. 7).

Each pair 201, 201', 201" of adjacent rings comprises a radially outer ring 203 and a radially inner ring 202.

Each of said inner ring 202 and outer ring 203 comprise open pockets 206, 207 for receiving the end 5a, 5b of leg of a hairpin conductor (see FIG. 7).

The open pockets 207 in said radially outer ring 203 have a radial outer wall 208 and a radially inner, open end 209.

The open pockets 206 in said radially inner ring 202 have a radial inner wall 210 and a radially outer, open end 211.

Each open pocket 206 of the inner ring 202 forms a joint closed pocket 212 with a respective open pocket 207 of the outer ring 203 when the inner ring 202 and the outer ring 203 are circumferentially aligned. The joint closed pockets 212 each have the radial outer wall 208 of an open pocket 207 of the outer ring 203 and the radial inner wall 210 of an open pocket 206 of the inner ring 202.

FIG. 7 shows a perspective view of a further detail of a device for twisting ends of legs of hairpin conductors.

At least one of said inner ring 202 and said outer ring 203 is moveable in a circumferential direction 204 relative to the other ring 202, 203. Preferably said inner ring 203 and said outer ring 202 are moveable in circumferential opposite directions 204, 205.

Each open pocket 206 of the inner ring 202 forms a joint closed pocket 212 for receiving a pair of end 6 of legs 5a, 5b with a respective open pocket 207 of the outer ring 203 when the inner ring 202 and the outer ring 203 are circumferentially aligned.

The rings 202, 203 are circumferentially moveable, such that open pockets 206 of the inner ring 202 and open pockets 207 of the outer ring 203 form first joint closed pockets 212 in a starting position and form second joint closed pockets in an end position. New pairs of ends of legs are formed, which are housed in the second joint closed pockets.

The invention claimed is:

1. A device for widening ends of legs of hairpin conductors arranged in slots of a stator core, said device comprising:
at least one finger configured to radially move the ends of legs of hairpin conductors, wherein:
said at least one finger is arranged to move radially inward and radially outward, and
said at least one finger is arranged to move axially upward and axially downward;
at least one radially extending arm; and
a separation member being arranged adjacent to an end of said arm, wherein said separation member is designed for being positioned between two ends of radially neighboring legs of pairs of said hairpin conductors, and wherein:
said at least one finger has a first section adjacent to the separation member,
said first section has a first radial width dimensioned to receive at least one pair of ends of legs and is adapted for moving said at least one pair of ends of legs when said at least one finger is radially moved,
said at least one finger has a second section, which does not overlap with the first section, said second section having a second radial width,
said first radial width is smaller than said second radial width, and said second section is dimensioned to receive at least one pair of legs without moving, when said at least one finger is radially moved, and
a separation web is arranged between the first section and the second section.

2. The device of claim 1, wherein said at least one finger is adapted to radially move a first end of said pair of legs over a radial moving distance and wherein a radial length of said arm is larger than the sum of said radial moving distance and at least twice a radial extension of said pairs of ends of said legs.

3. The device of claim 2, wherein said first end of said pair of legs is a radially outermost end of said pair of legs.

4. The device of claim 1, wherein:
said at least one finger has a seat for axially receiving said ends of said legs of hairpin conductors;
said seat comprises a first compartment providing said first section and having a first radial compartment width dimensioned to receive at least one pair of legs, and a second compartment providing said second section and having a second radial compartment width; and
wherein said first radial compartment width is smaller than said second radial compartment width.

5. The device of claim 4, wherein said first compartment is dimensioned to receive exactly one pair of ends of said legs.

6. The device of claim 4 wherein said second compartment is dimensioned to receive at least two pairs of ends of said legs.

7. The device of claim 4, wherein said first compartment is a first radially inner compartment.

8. The device of claim 4, wherein said second compartment is a second radially outer compartment.

9. The device of claim 1, further comprising a plurality of circularly arranged fingers, and wherein said fingers are independently moveable.

10. A system for preparing ends of legs of hairpin conductors in a stator core for welding, comprising:
a device for widening said ends of legs according to claim 1; and
a device for twisting, comprising a first ring coaxial with a second ring and extending around a twisting axis, wherein each ring comprises an array of pockets and is relatively rotatable with respect to each other around said twisting axis.

11. The device of claim 1, wherein said end of said arm is a radially inner end.

12. The device of claim 1, wherein said first section of said at least one finger is a radially inner section.

13. The device of claim 1, wherein the second section of said at least one finger is a radially outer section.

14. A method for widening ends of legs of hairpin conductors arranged in slots of a stator core, said method comprising:
- positioning a separation member being arranged adjacent to an end of at least one radially extending arm positioned between two ends of radially neighboring pairs of legs of said hairpin conductors;
- positioning at least one finger to radially move the two ends of the radially neighboring pairs of legs, wherein:
  - the at least one finger is arranged to move radially inward, radially outward, axially upward, and axially downward,
  - the at least one finger has a first section adjacent to the separation member,
  - the first section has a first radial width smaller than the second radial width and is adapted for moving at least one pair of ends of the radially neighboring pairs of legs,
  - the at least one finger has a second section, which does not overlap with the first section,
  - the second section has a second radial width and is dimensioned to receive at least one pair of the radially neighboring pairs of legs without moving when the at least one finger is radially moved,
  - the first radial width is smaller than the second radial width, and
  - a separation web is arranged between the first section and the second section;
- radially moving at least one first pair of legs of said hairpin conductors by radially moving said separation member;
- disengaging said at least one first pair of ends of legs from said separation member; and
- radially moving said separation member to a radial position corresponding to the radial position of at least one second pair of legs while keeping said at least one first pair of legs stationary.

15. The method of claim 14, further comprising:
- inserting said at least one first pair of ends of legs in a first compartment of a seat of a finger, said first radial compartment having a first radial compartment width;
- moving said at least one first pair of legs radially by moving said finger radially;
- disengaging said at least one first pair of ends of said legs from said first compartment;
- radially moving said finger to a radial position corresponding to the radial position of at least one second pair of ends of legs;
- inserting said at least one second pair of ends of legs into said first compartment and inserting said at least one first pair of ends of legs in a second compartment having a second radial compartment width larger than said first radial width; and
- moving said second pair of ends of legs radially by moving said finger radially, while keeping the at least one first pair of ends of legs stationary.

16. The method of claim 15 further comprising twisting said ends of legs of said hairpin conductors arranged in said slot of said stator core.

17. The method of claim 14, wherein said end of said radially extending arm comprises a radially inner end of said radially extending arm.

18. The method of claim 14, further comprising radially moving said second pair of legs by radially moving said separation member, while keeping said at least one first pair of legs stationary.

* * * * *